(12) United States Patent
Humphreys (10) Patent No.: US 8,567,388 B2
(45) Date of Patent: Oct. 29, 2013

(54) HOTWATER TANK

(75) Inventor: Michael Humphreys, Nanjing (CN)

(73) Assignee: Apricus Inc, Brandford, CT (US)

( * ) Notice: Subject to any disclaimer, the term of this patent is extended or adjusted under 35 U.S.C. 154(b) by 157 days.

(21) Appl. No.: 13/033,230

(22) Filed: Feb. 23, 2011

(65) Prior Publication Data

US 2012/0211002 A1   Aug. 23, 2012

(51) Int. Cl.
F24J 2/04 (2006.01)

(52) U.S. Cl.
USPC .............................. 126/640; 220/722; 220/378

(58) Field of Classification Search
USPC ....................... 126/640; 122/35; 220/551, 552
See application file for complete search history.

(56) References Cited

U.S. PATENT DOCUMENTS

| | | | |
|---|---|---|---|
| 2,773,488 A * | 12/1956 | MacCracken et al. | 122/161 |
| 4,027,821 A * | 6/1977 | Hayes et al. | 126/588 |
| 4,155,976 A * | 5/1979 | Drake et al. | 422/41 |
| 4,269,167 A | 5/1981 | Embree | |
| 4,324,228 A | 4/1982 | Shippee | |
| 4,397,294 A | 8/1983 | Mancebo | |
| 4,419,983 A * | 12/1983 | Holland | 126/639 |
| 4,510,922 A | 4/1985 | Roussos et al. | |
| 4,562,828 A | 1/1986 | Koskela | |
| 4,574,779 A | 3/1986 | Hayes | |
| 4,930,492 A | 6/1990 | Rich | |
| 5,159,918 A | 11/1992 | Roehl | |
| 5,575,276 A | 11/1996 | Fossum et al. | |
| 2007/0227468 A1 * | 10/2007 | Gordon et al. | 122/13.01 |
| 2007/0251468 A1 * | 11/2007 | Houle | 122/19.2 |
| 2008/0271811 A1 * | 11/2008 | Healy | 141/59 |

FOREIGN PATENT DOCUMENTS

WO       WO 0239028 A1 *   5/2002

* cited by examiner

*Primary Examiner* — Kenneth Rinehart
*Assistant Examiner* — Jason Lau
(74) *Attorney, Agent, or Firm* — St. Onge Steward Johnston & Reens LLC (57) ABSTRACT

A hot water storage tank having features to minimize heat loss and improve stratification throughout the tank. The tank having an inner lid and outer lid. The tank having a bladder. A tank having a solar stratification input pipe, the solar stratification input pipe having one or more holes, the one or more holes allowing the fluid to exit the solar stratification input pipe at a level where the fluid is of similar density to the fluid in the tank maintaining stratification throughout the tank, and the solar stratification input pipe being located within the tank and parallel to the longitudinal axis of the tank.

24 Claims, 8 Drawing Sheets

HOTWATER TANK

FIELD OF THE INVENTION

The present invention relates to a hot water storage tank having features to minimize heat loss and improve stratification throughout the tank.

BACKGROUND OF THE INVENTION

Hot water storage tanks are used to provide and circulate hot water throughout a plumbing system. Existing hot water storage tanks normally comprise an insulated storage vessel and a heating source. There are many designs for tanks that heat up, store and then deliver hot water to a standard outlet, such as a faucet.

The most common tank design for a domestic hot water tank is one that is made of mild steel lined with ceramic or glass. Other existing tanks are made from Inox or 316 grade stainless steel, fiberglass, various plastics or rubber materials.

Hot water storage tanks may be categorized into pressurized tanks or non-pressurized (atmospheric) tanks. A pressurized tank operates under pressure, with the tank always being full of water. A pressure relief valve and sometimes also an expansion tank are used to keep the pressure within the tank at a safe level for use.

Non-pressurized tanks, in contrast to pressurized tanks, are normally open to the atmosphere and can "breathe" as the water within the tank expands and contracts. The top of the tank for a non-pressurized tank will normally have an air pocket.

Non-pressurized tanks suffer from various deficiencies, as these tanks are often inefficient and substantial amounts of heat and energy as they are open to the atmosphere and not sealed. Furthermore, non-pressurized tanks may suffer from dirt and other external elements entering the tank, as non-pressurized tanks are open and may be not fully sealed to external elements.

It is thus desirable to provide a non-pressurized tank that has minimal loss of energy to the atmosphere. It is further desirable for a non-pressurized tank to be sealed, such that external elements will not enter and contaminate the fluid within the non-pressurized tank.

In the existing art, tanks have been designed to allow for various systems to heat the fluid located within the tank. Existing tanks may heat the fluid via a boiler circuit, a solar circuit, electricity, gas, a heat pump, or other such heating technique. Solar heating has become an important technique, as using solar heating, allows for a relatively less expensive way to heat hot water.

Various existing systems provide for teaching solar heating of water in a thermal storage tank. U.S. Pat. No. 5,575,276 (Fossum et al.) discloses a solar thermal water heating system that sends the water to a solar circuit; U.S. Pat. No. 5,159,918 (Roehl) discloses a hot water storage tank used for storage collectors; and U.S. Pat. No. 4,510,922 (Roussos et al.) discloses the concept of thermal stratification in a hot water tank.

However, none of these existing systems provide for a hot water storage tank that involves a single multipurpose tank design that incorporates multiple ways to heat the water within the tank. Furthermore, none of these existing designs involves a multipurpose tank that has multiple kits that may be quickly mounted and connected to the tank.

It is thus desirable to provide for a single multipurpose tank design that may incorporate the ability to provide hot water, space heating, pool heating and accept multiple energy sources such as gas, electric, heat pump, solid fuel boiler and solar thermal. It is desirable to provide a multipurpose tank that has the capability of allowing multiple kits to be quickly mounted and connected to the tank.

It is further desirable to make the integration of multiple uses and varied energy sources simple and cost effective. It is further desirable to provide a non-pressurized tank that overcomes the deficiencies of existing systems.

SUMMARY OF THE INVENTION

Thus, it is an object of the present invention to provide a non-pressurized tank that has minimal loss of energy to the atmosphere. It is another object of the present invention to provide a non-pressurized tank that may be sealed, such that external elements will not enter and contaminate the fluid within the non-pressurized tank.

It is another object of the present invention to provide for a multipurpose tank, the tank having capabilities to provide hot water, space heating, and pool heating and may accept multiple energy sources such as gas, electric, heat pump, solid fuel boiler and solar thermal. It is an object of the invention for the multipurpose tank to accept one or more of these energy sources for heating the fluid within the tank.

It is another object of the invention to provide a tank that makes the integration of multiple uses and varied energy sources simple and cost effective. It is another object of the invention to provide a non-pressurized tank that overcomes the deficiencies of existing systems.

These objects of the invention are achieved by providing a tank for heating and storing a fluid comprising: a housing, the housing comprising a base and at least one side wall, the at least one side wall and the base forming an internal body for storing a fluid; and a double lid, the double lid being placed upon the housing, the double lid comprising: an outer lid, an inner lid, the inner lid having a hole and being located within the outer lid.

Other objects of the invention are achieved by providing a tank for heating and storing a fluid comprising: a housing, the housing comprising a base and at least one side wall, the at least one side wall and the base forming an internal body for storing a fluid; and a bladder, the bladder being located on the top of the housing and sealing the internal body of the housing, the bladder being able to expand and contract.

Other objects of the invention are achieved by providing a tank for heating and storing a fluid comprising: a housing, the housing comprising a base and at least one side wall, the at least one side wall and the base forming an internal body for storing a fluid; a lid; and a solar stratification input pipe, the solar stratification input pipe returning the fluid from a solar thermal heating circuit, wherein the solar stratification input pipe has one or more holes, the one or more holes allowing the fluid to exit the solar stratification input pipe at a level where the fluid is of similar density to the fluid in the tank maintaining stratification throughout the tank, and wherein the solar stratification input pipe is located within the tank and parallel to the longitudinal axis of the tank.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Objects of the invention are directed to providing a tank for heating and storing a fluid. Other objects of the invention involve providing a tank that makes the integration of multiple heating methods and varied energy sources simple and cost effective.

Some objects of the invention are achieved by providing a tank for heating and storing a fluid comprising: a housing, the housing comprising a base and at least one side wall, the at least one side wall and the base forming an internal body for storing a fluid; and a double lid, the double lid being placed upon the housing, the double lid comprising: an outer lid and an inner lid, the inner lid having a hole and being located within the outer lid.

The tank may further have a seal on top of the hole located within the inner lid. The seal may have one or more cut or crevice to allow only fluid vapor to be released when there is a slight pressure gradient. The seal and double lid structure may be used to seal the housing, while still allowing the tank to breathe. The seal may also be made of rubber. The seal may reduce excessive breathing of the tank, and may reduce fluid such as steam from rising out of the inner body of the tank.

The tank may have an air pocket formed between the inner lid and the outer lid, the air pocket promoting condensation of the fluid. The condensation of fluid within the air pocket may enter the hole in the inner lid and may return to the internal body of the tank.

The tank may further comprise an output pipe, the output pipe allowing the fluid to exit the tank, and an input pipe, the input pipe allowing the fluid to return to the tank, wherein the fluid that is returned to the tank enters the tank above the fluid level of the fluid in the tank. This is to increase thermal stratification throughout the tank.

The tank may further comprise a solar stratification output pipe allowing fluid from the lower portion of the tank to exit the tank and enter a solar thermal heating circuit, and a solar stratification input pipe, the solar stratification input pipe returning the fluid into the tank at a level where the fluid in the tank is of a similar density to the level of the fluid located within the internal body of the tank. This is to increase thermal stratification throughout the tank.

The solar stratification input pipe may be located within the tank and parallel to the longitudinal axis of the tank. The fluid from the solar stratification input pipe may enter the internal body of the housing at the top of the tank.

The tank may be made of polypropylene and tank may be non-pressurized. The tank may have a shape selected from a group consisting of a cylinder, rectangular cube, polyhedron, hexahedron, cuboid, trapezoid, pentagon, or cone.

The tank may be able to accommodate a wide range of applications. The tank may allow various kits to be quickly mounted and connected to the tank. The various kits include: a domestic hot water kit, space heating kit, pool heating kit, boiler circulation kit, solar circulation kit, commercial hot water kit. Other kits may also be used that may be adapted to the tank.

The tank may have the space between the inner and outer lid allow for "breathing" of the tank, but not directly to the outside, so that when water vapor enters the chamber between the two lids it will cool and condense, and then may run or be sucked back into the main tank chamber through the hole in the inner lid. Breathing of air may still occur out of the tank, as there is not a strong physical seal between the outer lid and the internal body of the tank. Having a double lid structure allows for increased condensation, so that the high-energy water vapor may return to the tank and will not be lost.

Other objectives are achieved by other embodiments of the invention, which provide a tank for heating and storing a fluid comprising: a housing, the housing comprising a base and at least one side wall, the at least one side wall and the base forming an internal body for storing a fluid; and a bladder, the bladder being located on the top of the housing and sealing the internal body of the housing, the bladder being able to expand and contract.

The bladder may be comprised of a film and an inner lid, the inner lid having a hole. The hole may be in the center of the inner lid in certain embodiments. The tank may further comprise an outer lid, the outer lid being able to receive the bladder. The bladder may allow for air expansion and contraction while eliminating air vapor escape and minimizing heat loss.

The tank may have an air pocket formed between the bladder and the outer lid, the air pocket promoting condensation of the fluid. The fluid which then condenses because of the air pocket and the bladder may then enter the hole in the inner lid and may return the fluid to the internal body of the tank.

The tank may further comprise an output pipe, the output pipe allowing the fluid to exit the tank, and an input pipe, the input pipe allowing the fluid to return to the tank, wherein the fluid that is returned to the tank is enters the tank above the fluid level of the fluid in the tank.

The tank may further comprise a solar stratification output pipe allowing fluid to exit the tank and enter the solar thermal heating circuit, and a solar stratification input pipe, the solar stratification input pipe returning the fluid into the tank at a level where the fluid in the tank is of a similar density to the level of the fluid located within the internal body of the tank. This is to increase thermal stratification throughout the tank.

The solar stratification input pipe may be located within the tank and may be parallel to the longitudinal axis of the tank. The fluid from the solar stratification input pipe may enter the internal body of the housing at the top of the tank.

The tank may have its housing further comprise one or more insulation layers. The one or more tank insulation layers may be used to prevent heat loss in the tank. The tank may be made of polypropylene and the tank may be non-pressurized. The tank may also be made of a material that does not have good heat transfer properties. It is an objective of the tank to retain heat and not transfer and lose heat.

The tank may have a shape selected from a group consisting of a cylinder, rectangular cube, polyhedron, hexahedron, cuboid, trapezoid, pentagon, or cone. The tank may also have a shape selected from other known tanks in the art.

The tank may be able to accommodate a wide range of applications. The tank may allow various kits to be quickly mounted and connected to the tank. The various kits include: a domestic hot water kit, space heating kit, pool heating kit, boiler circulation kit, solar circulation kit, commercial hot water kit. The tank may be designed to be both a drain-back tank and a hot water storage tank. Drain back is a circuit whereby the liquid in the circuit drains back into the storage vessel once the circulation pump stops, thus draining empty any piping and equipment above the tank water level height.

Other objects of the invention are achieved by providing a tank for heating and storing a fluid comprising: a housing, the housing comprising a base and at least one side wall, the at least one side wall and the base forming an internal body for storing a fluid; a lid; and a solar stratification input pipe, the solar stratification input pipe returning the fluid from a solar thermal heating circuit, wherein the solar stratification input pipe has one or more holes, the one or more holes allowing the fluid to exit the solar stratification input pipe at a level where the fluid is of similar density to the fluid in the tank maintaining stratification throughout the tank, and wherein the solar stratification input pipe is located within the tank and parallel to the longitudinal axis of the tank.

The solar stratification input pipe and the solar stratification output pipe may be made of polypropylene, plastic or a high density material that is lightweight and low cost. The tank may also be made of a material that does not have good heat transfer properties.

The tank may be non-pressurized and the tank may be made of polypropylene or high density plastic. The tank may further have a solar stratification output pipe allowing fluid to be drawn from the lower portion of the storage tank and to enter the solar thermal heating circuit. The solar stratification input pipe may extend the full height of the inner tank accepting solar return fluid at the top of the tank.

Other objects of the invention are achieved by providing a tank for heating and storing a fluid comprising: a housing, the housing comprising a base and at least one side wall, the at least one side wall and the base forming an internal body for storing a fluid; and a double lid, the double lid being placed upon the housing to seal the housing, the double lid comprising: an outer lid; an inner lid, the inner lid having a hole and being located within the outer lid, and a film, the film being placed on top of the inner lid, the film being able to expand and contract, wherein the film and the inner lid form a bladder; a solar stratification output pipe, the solar stratification output pipe allowing the fluid to leave the tank and enter a solar thermal heating circuit, a solar stratification input pipe, the solar stratification input pipe returning the fluid from the solar thermal heating circuit, wherein the solar stratification input pipe returns the fluid to the tank at a level where the fluid is of a similar density, maintaining stratification throughout the tank; and an output pipe, the output pipe allowing the fluid to leave the tank; and an input pipe, the input pipe returning the fluid to the tank above the level of fluid in the tank.

The fluid returning to the tank may enter via the input pipe and may be delivered above the level of the fluid within the tank such that the need for a vacuum breaker device is eliminated.

The tank may be designed to be both a tank for drain-back and for hot fluid storage. Drain back is a circuit whereby the liquid in the circuit drains back into the storage vessel once the circulation pump stops, thus draining empty any piping and equipment above the tank water level height. The fluid returning to the tank via the input pipe allows air to enter the input pipe without restriction and provides drain-back operation.

Other objects of the invention are achieved by providing a tank for heating and storing a fluid comprising: a housing, the housing comprising a base and at least one side wall, the at least one side wall and the base forming an internal body for storing a fluid; and a double lid, the double lid being placed upon the housing to seal the housing, the double lid comprising: an outer lid, an inner lid, the inner lid having a hole and being located within the outer lid, and a film, the film being placed on top of the inner lid, the film being able to expand and contract, wherein the film and the inner lid form a bladder.

Other objects of the invention are achieved by providing a tank that has a well sealed lid that controls direct breathing to minimize water vapor loss. The tank may breathe a bit, otherwise the tank will become pressurized or a vacuum as it cools. The tank design may have a central hole formed in an inner lid that is combined with a thin plastic film on top of the inner lid that forms a bladder which can accept daily expansion and contraction of air in the tank. Any fluid vapor (typically water vapor) that exits the hole in the tank may be able to dribble back into the tank once it condenses.

The tank may have a double lid design that provides an air pocket between the plastic film and the outer lid which promotes condensation of any water vapor while still minimizing convective heat loss. The diameter of the inner lid may be smaller than the diameter of the outer lid.

Other objects of the invention are achieved by providing a tank where the return water is delivered into the top of the tank. A solar stratification pipe may be used, the stratification pipe being a polypropylene pipe or pipe made of a similar high density, strong material that has poor heat transfer properties. The pipe may extend the full height of the inner tank accepting the solar return water at the top. The large diameter of the pipe slows the speed of the water allowing it to gradually descend down the pipe and enter the main tank water through small holes in the pipe. The descending water will find water of similar density (temperature) before it exits the pipe, thus, maintaining temperature stratification and optimizing overall solar and tank efficiency.

Other objects of the invention may be achieved by providing an integrated hot water storage and drain-back tank. The tank may be designed to be both a drain-back tank and a hot water storage tank. The tank design may deliver the return solar water above the water level thus allowing air to enter the return pipe without restriction once the pump stops circulation providing reliable drain-back operation.

Figure 1:
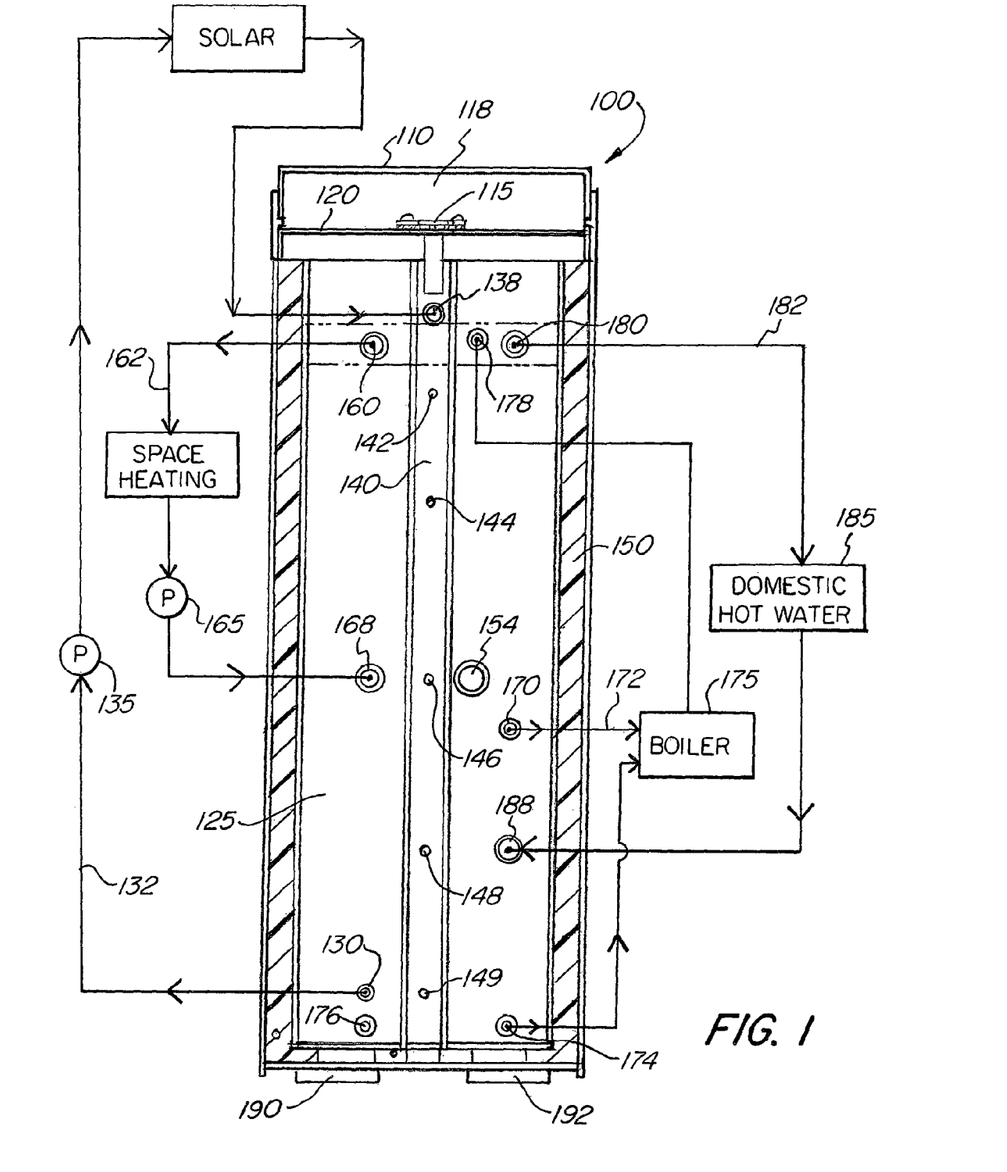
FIG. 1 is an side view of an embodiment of the tank of the present invention.

Referring to FIG. 1, tank 100 is provided. Tank 100 has outer lid 110 and inner lid 120. Inner lid 120 may be insulated in certain embodiments. Tank 100 also has a seal or sealing element 115. Sealing element 115 is shown on top of inner lid 120. Inner lid 120 may have a hole, and in certain embodiments the hole is central to tank 100. Seal 115 may be located on top of the hole in inner lid 120. Also air pocket 118 is shown between outer lid 110 and inner lid 120. Air pocket 118 promotes condensation of the fluid.

Tank 100 is shown having inner body 125 and solar stratification pipe 140. Holes 142, 144, 146, 148 and 149 are shown in the stratification pipe 140. These holes allow the fluid, typically water, located within the stratification pipe 140 to enter inner body 125 of tank 100. Inner body 125 may also be referred to as an internal body of the housing of the tank.

Tank 100 has solar stratification output 130 which allows fluid going via solar stratification output pipe 132 to be heated by the solar thermal heating circuit. Solar stratification output pipe 132 allows fluid to reach the solar thermal heating circuit via a pump 135.

To return fluid to tank 100, solar stratification input 138 is shown, which allows fluid to enter the stratification pipe 140. Stratification pipe 140 is shown parallel to the longitudinal axis of tank 100. Solar stratification output 130 removes fluid from the bottom of tank 100 and solar stratification input pipe 138 provides fluid returning from the solar thermal heating circuit to the top of tank 100.

Tank 100 also has boiler output 170 which allows fluid to enter boiler 175 via a pipe 172. Boiler output 176 is also shown, which can take the fluid to various boilers or to boiler 175. Boiler input 178 is shown where the fluid may return to tank 100. Having the boiler is an optional part of tank 100 and is an example of an optional kit, which may be used with tank 100.

Tank 100 also has optional space heating. This is shown with space heating output 160 which allows fluid to enter a space heater via pipe 162. Fluid is pumped in this circuit via pump 165 and returns to tank 100 via space heating return 168.

Tank 100 also has electric heating element 154. This feature is optional to various embodiments of tank 10. Also tank insulation layer 150 is optional to tank 100.

Tank 100 has space heating, pool heating, boiler circulation, solar circulation, and electrical heating elements kit attached to tank 100, which are available to certain embodiments of the invention. Tank 100 may not have all kits attached at one time. Tank 100 may have one or a combination of these kits.

Figure 2:
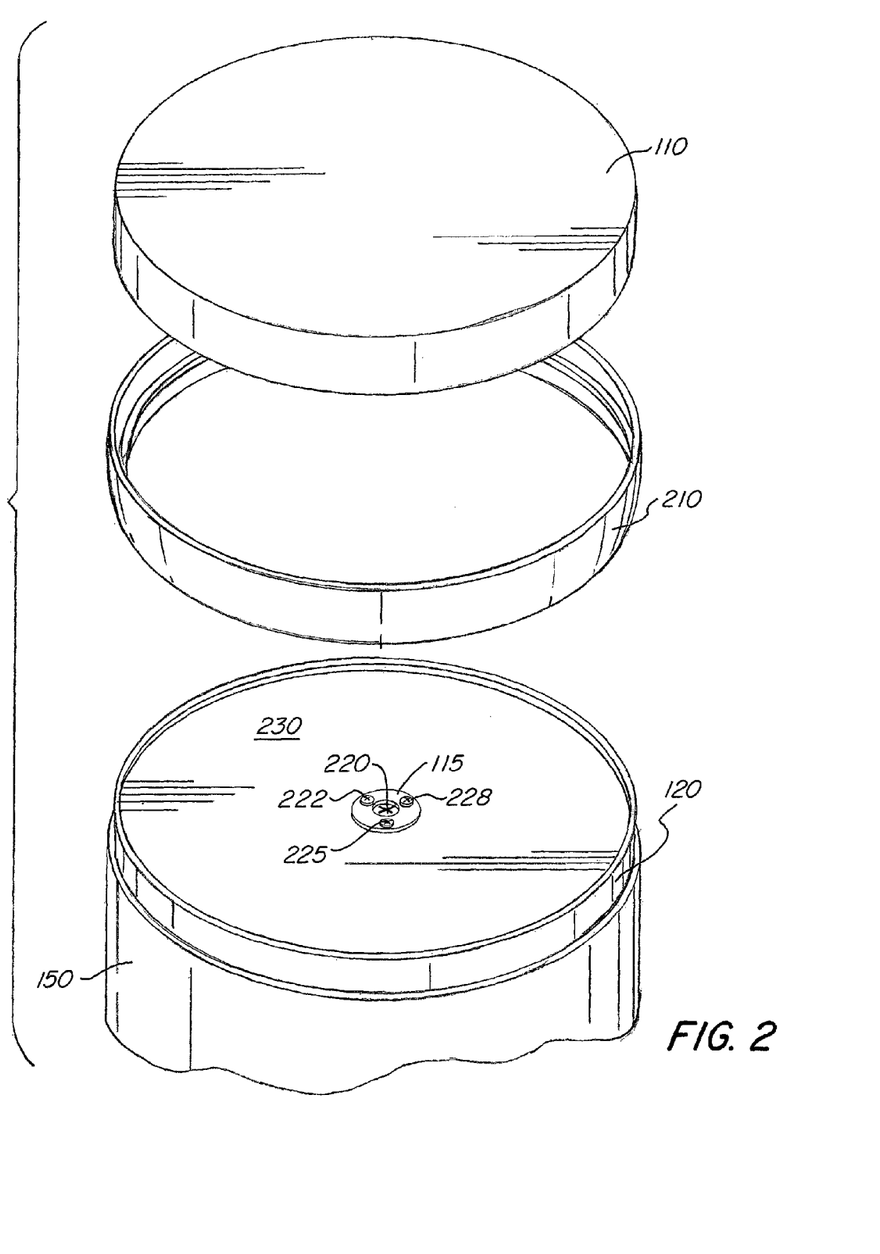
FIG. 2 is an exploded view of the top of the embodiment of FIG. 1.

FIG. 2 shows an exploded view of the top of tank 100. Here, outer lid 110 is shown as well as inner lid 120 and seal element 115. Inner lid 120 may be insulated in certain embodiments.

FIG. 2 also provides inner seal member 220 that covers a hole in inner lid 120. Three screws 222, 225 and 228 attach seal 115 to inner lid 120. Inner lid 120 has top 230. Seal 115 sits on top 230 of inner lid 120.

FIG. 2 also provides attachment member 210, which helps attach outer lid 110 to inner lid 120. Attachment member 210 is for certain embodiments of the invention.

Figure 3:
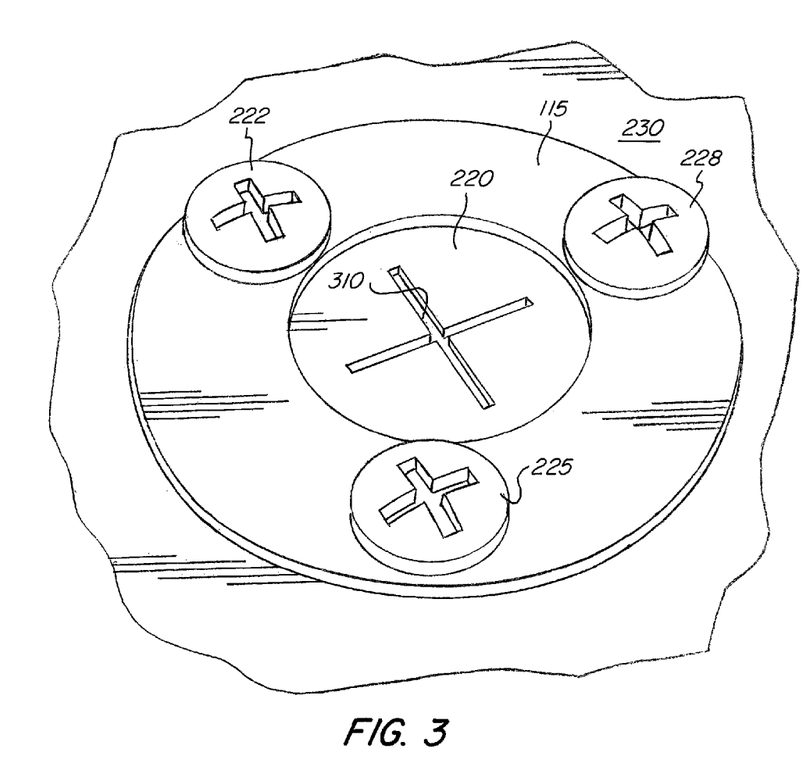
FIG. 3 is a blown up detailed view of the sealing element shown in FIG. 2.

FIG. 3 provides a blown up detailed view of seal element 115. Here, seal element 115 is shown on top 230 of inner lid 120. Here, slit or crevice 310 is shown as an "X" arrangement. When pressure in tank 100 increases, fluid vapor may leave tank 100 through slit 310. Seal 115 is attached to top 230 of inner lid 120 by three screws 222, 225 and 228. In other embodiments, more or less screws may be used to attach seal 115 to the top 230.

Figure 4:
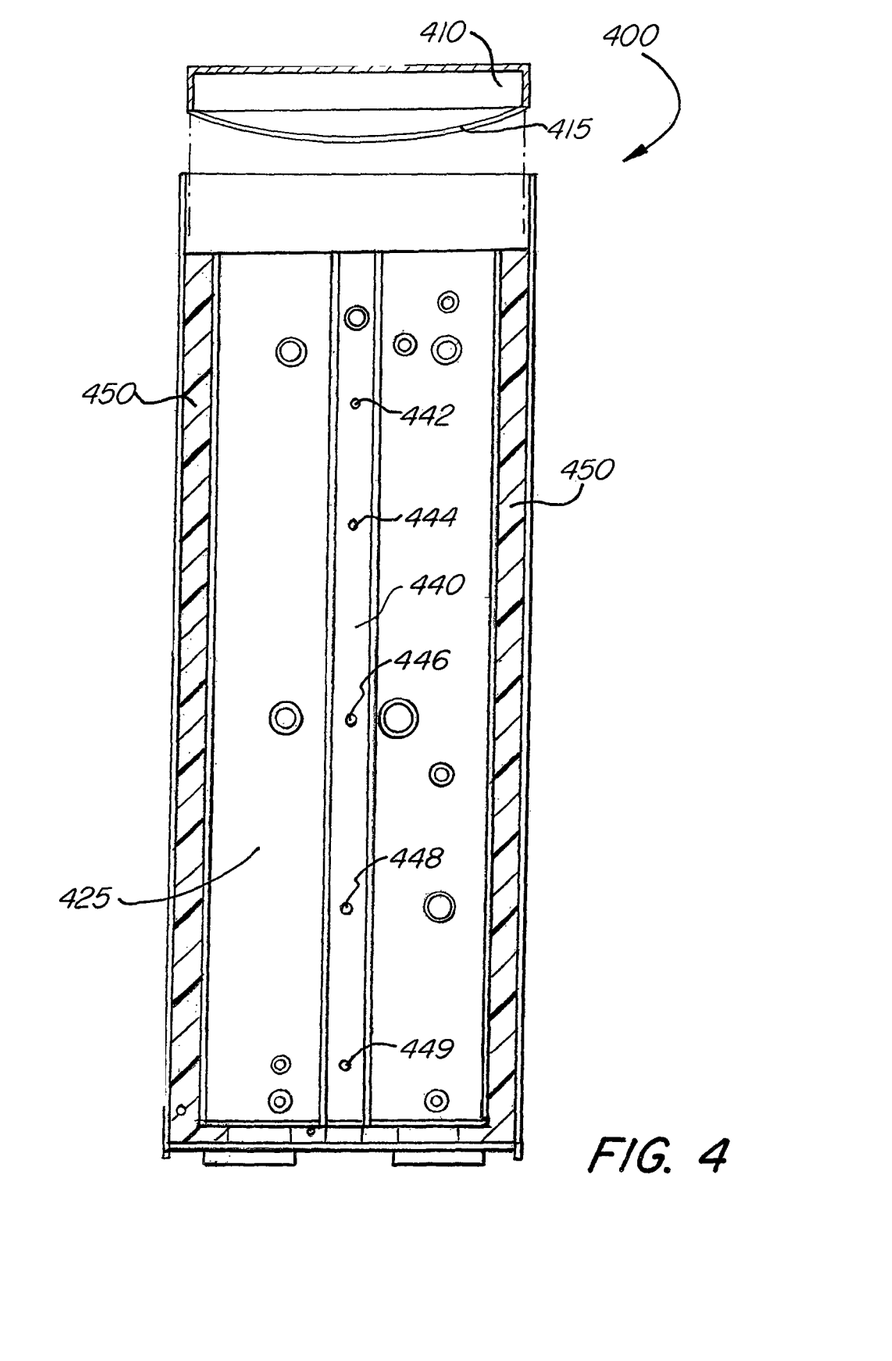
FIG. 4 is a perspective view of an exploded view of another embodiment of the tank of the present invention.

FIG. 4 shows another embodiment of the invention. Here tank 400 is shown having lid 410 and bladder 415. Bladder 415 is shown attached to lid 410 and bladder 415 may expand in a downward direction towards body 425 of tank 400. Inner body 425 of tank 400 is shown having stratification pipe 440. Holes 442, 444, 446, 448 and 449 are shown. There may be more or less holes than shown in this figure. The fluid may exit the holes at points where the temperature and density of the water in stratification pipe 440 is equal to the temperature and density of the water in the tank, thus maintaining stratification in the tank. FIG. 4 also provides tank insulation layer 450, which is optional to various embodiments of the invention.

Figure 5:
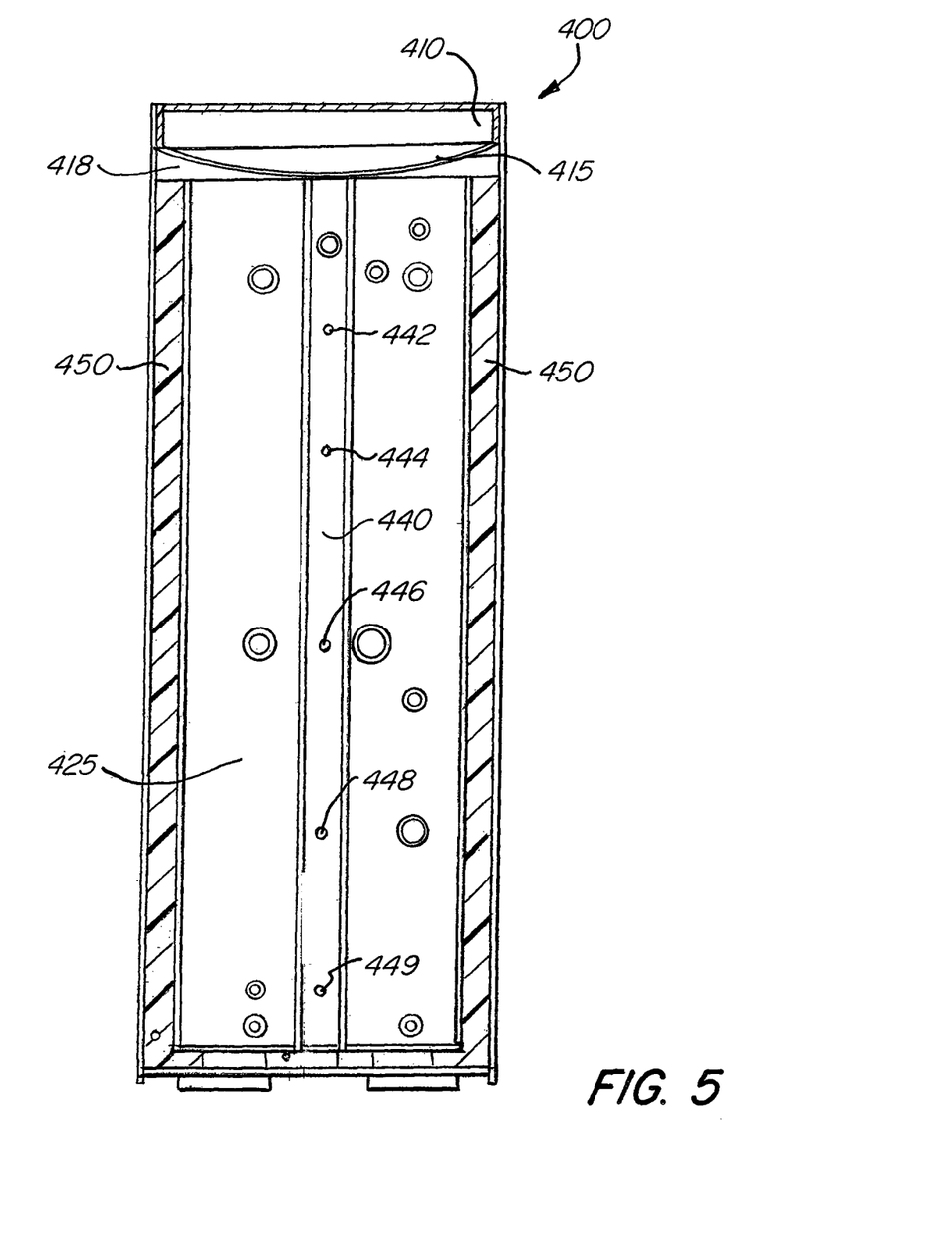
FIG. 5 is an assembled view of the tank of FIG. 4.

FIG. 5 provides an assembled view of tank 400. Here, tank 400 is shown having its bladder 415 attached to lid 410 in expanded form. An air pocket 418 is shown between the inner body 425 of tank 115 and lid 410. Also stratification pipe 440 is shown having holes 442, 444, 446, 448 and 449.

Figure 6:
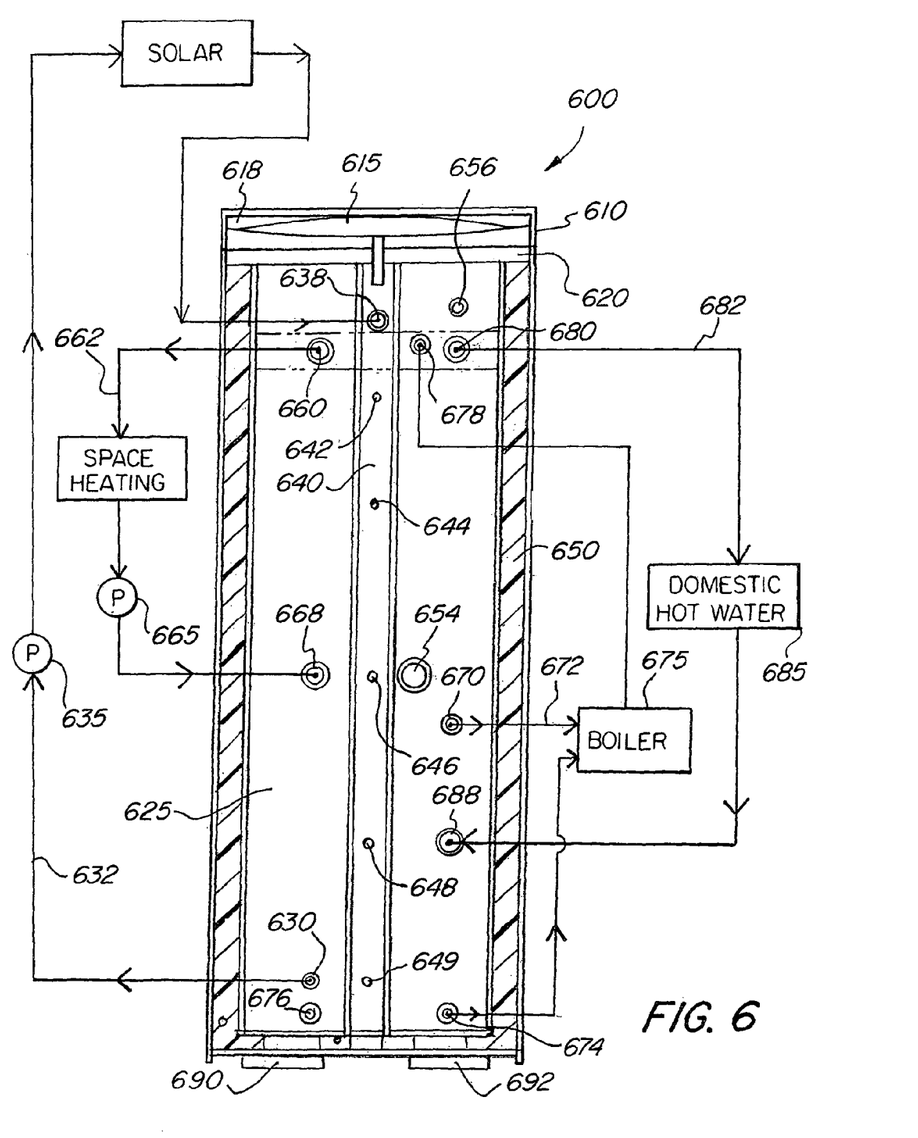
FIG. 6 is a perspective view of an embodiment of the tank of the present invention.

FIG. 6 shows another embodiment of the invention. In FIG. 6, tank 600 is provided. Tank 600 has outer lid 610, bladder 615 and inner lid 620. Inner lid 620 may be insulated in certain embodiments.

Tank 600 is shown having inner body 625 and solar stratification pipe 640. Holes 642, 644, 646, 648 and 649 are shown in the stratification pipe 640. These holes allow the water located within stratification pipe 640 to enter inner body 625 (housing) of tank 600.

Tank 600 has solar stratification output 630 which goes via solar stratification output pipe 632 to be heated by the solar thermal heating circuit. Solar stratification output pipe 632 allows fluid to reach the solar thermal heating circuit via pump 635. Solar stratification output 630 takes fluid from the bottom of tank 600 and returns the heated fluid to the top of tank 600 via solar stratification input 638. This allows fluid to return to tank 600 and enter stratification pipe 640. Stratification pipe 640 is shown parallel to the longitudinal axis of tank 600.

Tank 600 also has boiler output 670 which allows fluid to enter boiler 675 via pipe 672. Boiler output 676 is also shown, which can take the fluid to various boilers or to boiler 675. Boiler input 678 is shown where fluid may return to tank 600. Having the boiler is an optional part of tank 600 and is an example of a kit adapted for use with tank 600.

Tank 600 also has optional space heating. This is shown with space heating output 660 which allows fluid to enter a space heater via pipe 662. The fluid is pumped in this circuit via pump 665 and returns to tank 600 via space heating return 668.

Tank 600 also has overflow valve 656 and electric heating element 654. Both these features are optional to various embodiments of tank 600. Also tank insulation layer 650 is optional to tank 600.

Tank 600 has space heating, pool heating, boiler circulation, solar circulation, and electrical heating elements kit attached to the tank, which are available to certain embodiments of the invention. Tank 600 may not have all kits attached at one time. So tank 600 is adapted to have one or more, or a combination of the kits.

Figure 7:
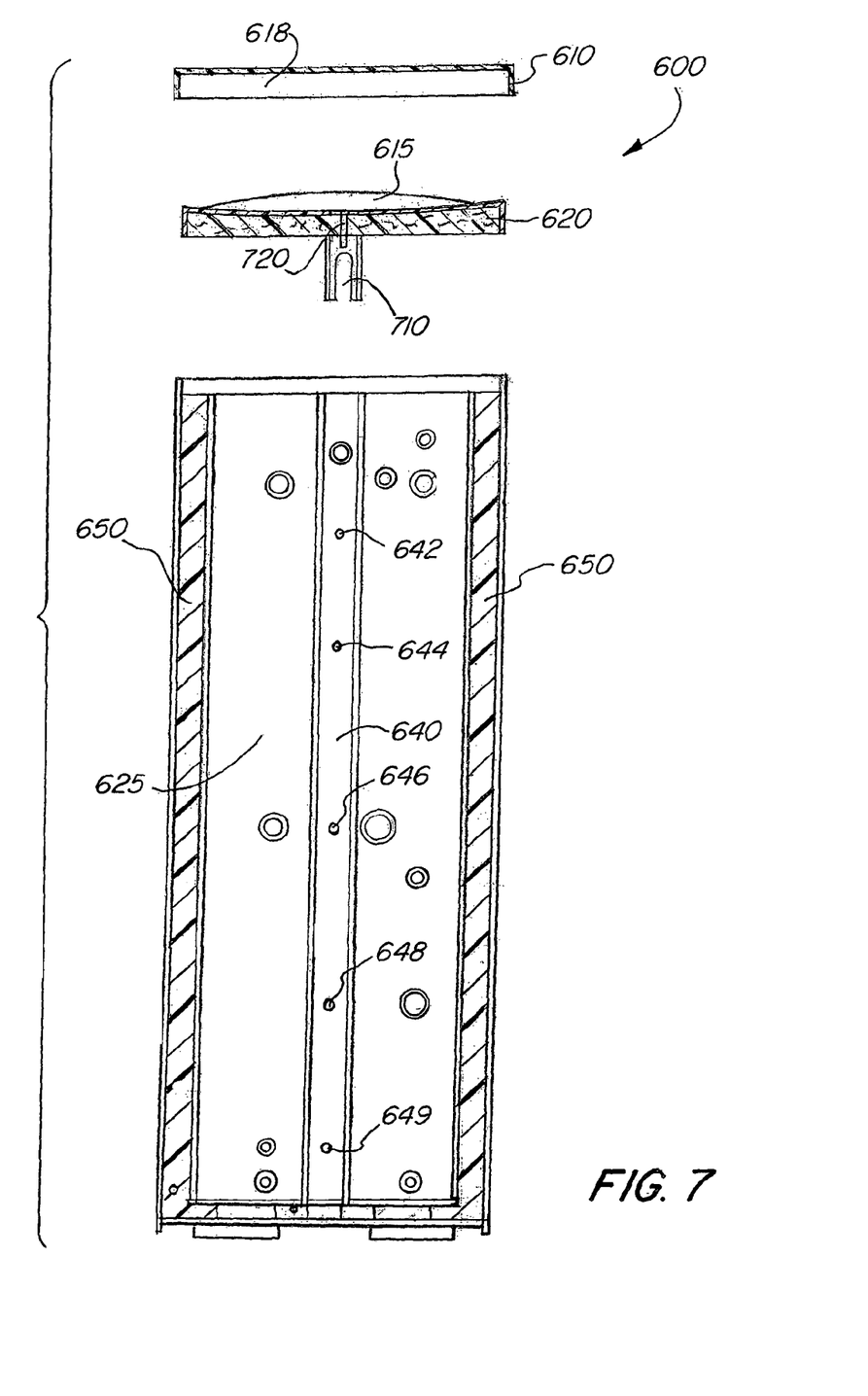
FIG. 7 is an exploded view of the tank of FIG. 6.

FIG. 7 shows an exploded view of tank 600. Here, outer lid 610 is shown as well as inner lid 620 and bladder 615. Inner lid 620 may be insulated in certain embodiments.

FIG. 7 also provides tank insulation layer 650 as well as stratification pipe 640 and holes 642, 644, 646, 648 and 649, which allow fluid entering from the solar thermal heating circuit to enter body 625 of tank 600 at various levels depending on temperature and density of the fluid.

FIG. 7 provides connector 710 and hole 720 located in inner lid 620. Connector 710 connects inner lid 620 to body 625 of tank 600. Hole 720 allows fluid that has condensed from the vapor state to return through inner lid 620 to body 625 of tank 600.

Figure 8:
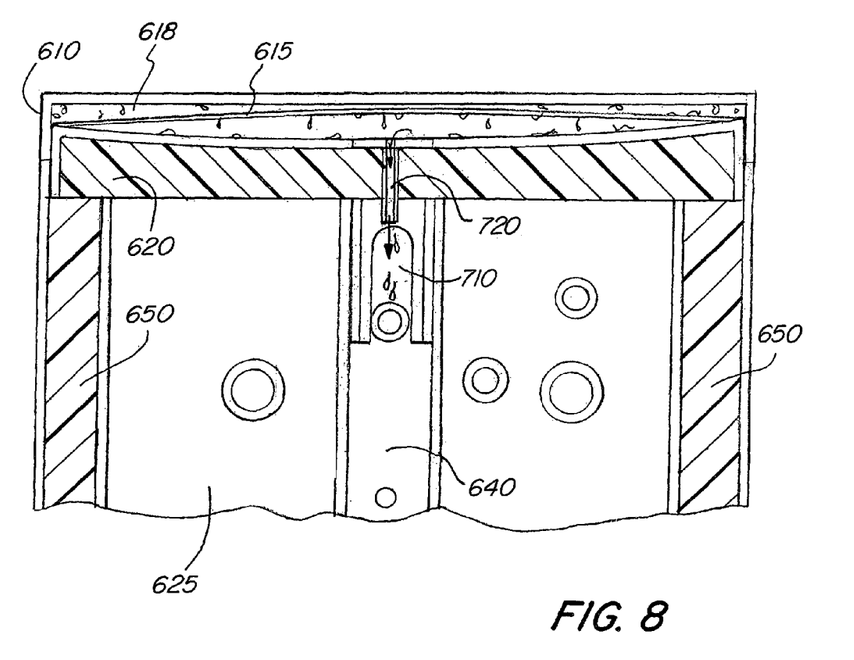
FIG. 8 is a blown up detailed view of the top section of the tank of FIG. 6.

FIG. 8 provides a blown up detailed view of the top of tank 600 of FIG. 6. Here, outer lid 610 is shown as well as bladder 615 and inner lid 620. Internal body 625 of tank 600 is shown having tank insulation layer 650 as well as stratification pipe 640. Connector 710 is also shown whereby hole 720 is shown, allowing the vapor which has condensed to fluid to return to body 625 of tank 600.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A tank for heating and storing a fluid comprising:
   a housing, the housing comprising a base and at least one side wall, the at least one side wall and the base forming an internal body for storing a fluid;
   a removable double lid being placed upon the housing, the double lid comprising:
   an outer lid, and an inner lid, the inner lid having a hole and being located within the outer lid, the inner lid being insulated; and
a bladder located between the inner lid and the outer lid, the bladder being able to expand and contract.

2. The tank of claim 1, wherein an air pocket is formed between the inner lid and the outer lid, the air pocket promoting condensation of the fluid.

3. The tank of claim 2, wherein the condensation of fluid within the air pocket enters the hole in the inner lid and returns to the internal body of the tank.

4. The tank of claim 1, further comprising a seal on top of the hole located within the inner lid.

5. The tank of claim 4, wherein the seal has a narrow opening to allow fluid vapor to be released when there is a slight pressure gradient.

6. The tank of claim 1, further comprising:
an output pipe, the output pipe allowing the fluid to exit the tank, and
an input pipe, the input pipe allowing the fluid to return to the tank,
wherein the fluid that is returned to the tank enters the tank above the fluid level of the fluid in the tank.

7. The tank of claim 1, further comprising:
a solar stratification output pipe allowing fluid from the lower portion of the tank to exit the tank and enter a solar thermal heating circuit, and
a solar stratification input pipe, the solar stratification input pipe returning the fluid into the tank at a level where the fluid in the tank is of a similar density to the level of the fluid located within the internal body of the tank.

8. The tank of claim 7, wherein the solar stratification input pipe is located within the tank and parallel to the longitudinal axis of the tank.

9. The tank of claim 7, wherein the fluid from the solar stratification input pipe enters the internal body of the housing at the top of the tank.

10. The tank of claim 1, wherein the tank is made of polypropylene and wherein the tank is non-pressurized.

11. The tank of claim 1, wherein the tank has a shape selected from a group consisting of a cylinder, rectangular cube, polyhedron, hexahedron, cuboid, trapezoid, pentagon, or cone.

12. A tank for heating and storing a fluid comprising:
a housing, the housing comprising a base and at least one side wall, the at least one side wall and the base forming an internal body for storing a fluid;
an outer lid; and
a bladder, the bladder being located on the top of the housing and sealing the internal body of the housing, the bladder being able to expand and contract,
wherein the bladder is comprised of a film and an inner lid, the inner lid having a hole, the inner lid having a seal located on top of the hole,
wherein the seal has a narrow opening to allow fluid vapor to be released when there is a slight pressure gradient, and
wherein the outer lid is able to receive the bladder.

13. The tank of claim 12, wherein an air pocket is formed between the bladder and the outer lid, the air pocket promoting condensation of the fluid.

14. The tank of claim 13, wherein the condensation of fluid within the bladder enters the hole in the inner lid and returns to the internal body of the tank.

15. The tank of claim 12, further comprising:
an output pipe, the output pipe allowing the fluid to exit the tank, and
an input pipe, the input pipe allowing the fluid to return to the tank,
wherein the fluid that is returned to the tank enters the tank above the fluid level of the fluid in the tank.

16. The tank of claim 12, further comprising:
a solar stratification output pipe allowing fluid from the lower portion of the tank to exit the tank and enter a solar thermal heating circuit, and
a solar stratification input pipe, the solar stratification input pipe returning the fluid into the tank at a level where the fluid in the tank is of a similar density to the level of the fluid located within the internal body of the tank.

17. The tank of claim 16, wherein the solar stratification input pipe is located within the tank and parallel to the longitudinal axis of the tank, and
wherein the fluid from the solar stratification input pipe enters the internal body of the housing at the top of the tank.

18. A tank for heating and storing a fluid comprising:
a housing, the housing comprising a base and at least one side wall, the at least one side wall and the base forming an internal body for storing a fluid; and
a double lid, the double lid being placed upon the housing to seal the housing, the double lid comprising:
an outer lid,
an inner lid, the inner lid having a hole and being located within the outer lid, the inner lid having a seal on top of the hole, the seal having a narrow opening to allow fluid vapor to be released when there is a slight pressure gradient, and
a film, the film being placed on top of the inner lid, the film being able to expand and contract, wherein the film and the inner lid form a bladder.

19. A tank for heating and storing a fluid comprising:
a housing, the housing comprising a base and at least one side wall, the at least one side wall and the base forming an internal body for storing a fluid;
lid located on top of the housing;
a bladder, the bladder attached to the lid, the bladder being able to expand in a downward direction towards the top of the housing; and
a solar stratification input pipe, the solar stratification input pipe returning the fluid from a solar thermal heating circuit,
wherein the solar stratification input pipe has one or more holes, the one or more holes allowing the fluid to exit the solar stratification input pipe at a level where the fluid is of similar density to the fluid in the tank maintaining stratification throughout the tank, and
wherein the solar stratification input pipe is located within the tank and parallel to the longitudinal axis of the tank.

20. The tank of claim 19, further comprising a solar stratification output pipe allowing fluid to enter the solar thermal heating circuit.

21. The tank of claim 19, wherein the solar stratification input pipe extends the full height of the inner tank accepting solar return fluid at the top of the tank.

22. The tank of claim 19, wherein the solar stratification input pipe and the solar stratification out pipe are made of polypropylene or plastic.

23. The tank of claim 19, wherein the tank is non-pressurized and wherein the tank is made of polypropylene or high density plastic material that has poor heat transfer properties.

24. A tank for heating and storing a fluid comprising:
a housing, the housing comprising a base and at least one side wall, the at least one side wall and the base forming an internal body for storing a fluid; and a double lid, the double lid being placed upon the housing to seal the housing, the double lid comprising:

an outer lid;

an inner lid, the inner lid having a hole and being located within the outer lid, the inner lid having a seal on top of the hole, the seal having a narrow opening to allow fluid vapor to be released when there is a slight pressure gradient, and a film, the film being placed on top of the inner lid, the film being able to expand and contract, wherein the film and the inner lid form a bladder;

a solar stratification output pipe, the solar stratification output pipe allowing the fluid to leave the tank and enter a solar thermal heating circuit, a solar stratification input pipe, the solar stratification input pipe returning the fluid from the solar thermal heating circuit, wherein the solar stratification input pipe returns the fluid to the tank at a level where the fluid is of a similar density, maintaining stratification throughout the tank; and an output pipe, the output pipe allowing the fluid from the bottom of the tank to leave the tank; and an input pipe, the input pipe returning the fluid to the tank above the level of fluid in the tank.

\* \* \* \* \*